(12) United States Patent
Oliver

(10) Patent No.: US 11,042,701 B2
(45) Date of Patent: Jun. 22, 2021

(54) METHOD AND APPARATUS FOR CONSENT DOCUMENT MANAGEMENT

(71) Applicant: Nokia Corporation, Espoo (FI)

(72) Inventor: Ian Justin Oliver, Söderkulla (FI)

(73) Assignee: Nokia Corporation, Espoo (FI)

( * ) Notice: Subject to any disclaimer, the term of this patent is extended or adjusted under 35 U.S.C. 154(b) by 320 days.

(21) Appl. No.: 16/014,944

(22) Filed: Jun. 21, 2018

(65) Prior Publication Data

US 2018/0300307 A1 Oct. 18, 2018

Related U.S. Application Data

(63) Continuation of application No. 13/720,410, filed on Dec. 19, 2012, now abandoned.

(60) Provisional application No. 61/581,903, filed on Dec. 30, 2011.

(51) Int. Cl.
*G06F 16/93* (2019.01)
*G06F 40/20* (2020.01)

(52) U.S. Cl.
CPC .................................. *G06F 40/20* (2020.01)

(58) Field of Classification Search
CPC .......... G06F 17/27; G06F 17/30; G06F 40/20; G06F 16/93
USPC ........................................................ 707/756
See application file for complete search history.

(56) References Cited

U.S. PATENT DOCUMENTS

| 5,485,600 | A | 1/1996 | Joseph et al. |
| 7,076,558 | B1 | 7/2006 | Dunn |
| 7,353,246 | B1 * | 4/2008 | Rosen ................. G06F 16/9558 709/202 |
| 7,454,508 | B2 * | 11/2008 | Mathew .................. G06F 21/62 709/229 |
| 7,559,034 | B1 | 7/2009 | Paperny et al. |
| 7,590,705 | B2 | 9/2009 | Mathew et al. |
| 7,707,642 | B1 | 4/2010 | Herbach et al. |
| 7,797,726 | B2 | 9/2010 | Ashley et al. |
| 8,090,960 | B2 | 1/2012 | Okawa |
| 8,424,102 | B1 * | 4/2013 | Herbach ................. G06F 21/60 726/27 |
| 8,474,012 | B2 | 6/2013 | Ahmed et al. |
| 8,656,184 | B2 * | 2/2014 | Miyazawa .............. G06F 8/658 713/191 |

(Continued)

OTHER PUBLICATIONS

KNAPP: "system for providing dynamic data informed consent to provide data privacy and security in database systems and in networked communications", Pub dated, May 17, 2001.*

(Continued)

*Primary Examiner* — Hanh B Thai
(74) *Attorney, Agent, or Firm* — Ditthavong, Steiner & Mlotkowski

(57) ABSTRACT

An approach is provided for consent document management. The consent platform causes, at least in part, a creation of one or more consent document objects representing one or more consent documents, metadata associated with the consent documents, or a combination thereof. Next, the consent platform processes and/or facilitates a processing of one or more responses to the one or more consent documents to cause, at least in part, a creation of one or more user response objects, wherein the one or more user response objects record the one or more responses on a per user basis.

20 Claims, 13 Drawing Sheets

(56) References Cited

U.S. PATENT DOCUMENTS

| | | | | |
|---|---|---|---|---|
| 8,683,035 | B2* | 3/2014 | Ahuja | H04L 63/0209 709/224 |
| 9,465,935 | B2* | 10/2016 | Cepuran | G06F 21/51 |
| 9,596,207 | B1* | 3/2017 | Lin | H04L 51/32 |
| 9,800,427 | B2* | 10/2017 | Cashman | H04L 12/1895 |
| 9,838,417 | B1 | 12/2017 | Khalid et al. | |
| 2001/0042088 | A1* | 11/2001 | Hotchkiss | G16H 20/90 715/255 |
| 2002/0010784 | A1* | 1/2002 | Clayton | G06F 21/6245 709/229 |
| 2003/0130867 | A1 | 7/2003 | Coelho et al. | |
| 2003/0143990 | A1 | 7/2003 | Minear et al. | |
| 2003/0229515 | A1* | 12/2003 | Rizvi | G16H 15/00 705/2 |
| 2004/0003072 | A1* | 1/2004 | Mathew | G06F 21/62 709/223 |
| 2004/0044628 | A1 | 3/2004 | Mathew et al. | |
| 2006/0178913 | A1* | 8/2006 | Lara | G16H 10/20 705/3 |
| 2007/0038765 | A1* | 2/2007 | Dunn | G06F 21/6218 709/229 |
| 2007/0067189 | A1* | 3/2007 | Boris | G16H 10/20 705/3 |
| 2007/0112660 | A1* | 5/2007 | Jung | G06Q 40/02 705/35 |
| 2007/0192140 | A1* | 8/2007 | Gropper | G16H 40/67 705/3 |
| 2007/0211876 | A1* | 9/2007 | Othmer | H04M 3/42221 379/201.01 |
| 2007/0226504 | A1* | 9/2007 | de la Iglesia | H04L 63/123 713/176 |
| 2007/0226510 | A1* | 9/2007 | Iglesia | H04L 63/123 713/177 |
| 2007/0238450 | A1 | 10/2007 | Hogberg | |
| 2008/0254769 | A1 | 10/2008 | Deshpande | |
| 2009/0112771 | A1 | 4/2009 | Little | |
| 2009/0265180 | A1 | 10/2009 | Ellison et al. | |
| 2010/0153707 | A1* | 6/2010 | Lentz, II | H04L 63/102 713/155 |
| 2010/0169343 | A1 | 7/2010 | Kenedy et al. | |
| 2010/0169803 | A1 | 7/2010 | Mazzzei et al. | |
| 2010/0257367 | A1* | 10/2010 | Johnson | G06Q 10/10 713/175 |
| 2011/0099380 | A1* | 4/2011 | Vandewater | H04L 9/3247 713/176 |
| 2011/0119075 | A1 | 5/2011 | Dhoble | |
| 2011/0191435 | A1* | 8/2011 | Burakoff | G06F 40/134 709/206 |
| 2011/0287748 | A1* | 11/2011 | Angel | H04M 7/0054 455/414.1 |
| 2012/0151557 | A1* | 6/2012 | Ahmed | G06F 21/6218 726/2 |
| 2013/0159021 | A1* | 6/2013 | Felsher | G06F 21/6245 705/3 |
| 2013/0246377 | A1* | 9/2013 | Gaitonde | H04L 63/0236 707/697 |
| 2013/0268357 | A1* | 10/2013 | Heath | G06Q 30/02 705/14.53 |
| 2016/0012556 | A1* | 1/2016 | Moore | G06Q 10/10 705/311 |
| 2016/0232534 | A1* | 8/2016 | Lacey | G06Q 20/4016 |

OTHER PUBLICATIONS

"MyVSAC School Manual", manual, Jun. 2010, retrieved from http://services.vsac.org/wps/wcm/connect/d41e10004a1f9f679460fc71caf9670b/myVSAC_Manual.pdf?MOD=AJPERES, pp. 1-29.

Notification of Transmittal of the International Search Report and the Written Opinion of the International Searching Authority, or the Declaration for International Application No. PCT/FI2012/051299, dated Apr. 12, 2013, pp. 1-15.

* cited by examiner

FIG. 6

601 — SINGLE MARKETING CONSENT: MARKETING CONSENT

VERSION: 1.0
TITLE = ABC Company Single Marketing Consent
COUNTRY = FI
LANGUAGE = FI
CONTENT = http://www.abccompany.com/smv/1.0/FI/FI/text.html
OPTIONS = YES, NO
STATUS = CURRENT

603 — LOCATION ANNEX: PRIVACY POLICY

VERSION: 2.3
TITLE = LOCATION CONSENT
COUNTRY = FI
LANGUAGE = EN
CONTENT = http://www.abccompany.com/policies/LC/FI/EN/text.html
OPTIONS = ALL, CITY, COUNTRY, NONE
STATUS = DEPRECIATED

FIG. 8B

CONSENT HISTORY: USER X

| NAME/VERSION | DOCUMENT ID | COUNTRY | LANGUAGE | DATE/TIME ACCEPTED |
|---|---|---|---|---|
| 1. APP 1 | | | | |
| • Version 1 | #909393 | COUNTRY Y | SPANISH | 02-02-YY/05:00PM |
| • Version 2 | #909393 | COUNTRY Y | SPANISH | 04-22-YY/05:00PM |
| • Version 3 | #909393 | COUNTRY Z | SPANISH | 05-12-YY/05:00PM |
| • Version 4 | #909393 | COUNTRY Z | SPANISH | 08-30-YY/05:00PM |
| 2. APP 2 | | | | |
| • Version 7 | #356987 | COUNTRY Z | SPANISH | 02-22-YY/05:00PM |
| • Version 8 | #356987 | COUNTRY Z | SPANISH | 10-24-YY/05:00PM |
| • Version 9 | #356987 | COUNTRY Z | SPANISH | 12-09-YY/05:00PM |
| 3. APP 3 | | | | |
| • Version 1 | #587654 | COUNTRY Z | SPANISH | 01-12-YY/05:00PM |
| • Version 2 | #587654 | COUNTRY Z | SPANISH | 03-16-YY/05:00PM |
| • Version 5 | #587654 | COUNTRY Z | SPANISH | 04-26-YY/05:00PM |
| • Version 6 | #587654 | COUNTRY Z | SPANISH | 05-29-YY/05:00PM |
| • Version 7 | #587654 | COUNTRY Z | SPANISH | 08-03-YY/05:00PM |
| • Version 8 | #587654 | COUNTRY Z | SPANISH | 10-12-YY/05:00PM |

SORT BY: NAME | ID | VERSION | COUNTRY | LANGUAGE | TIMESTAMP

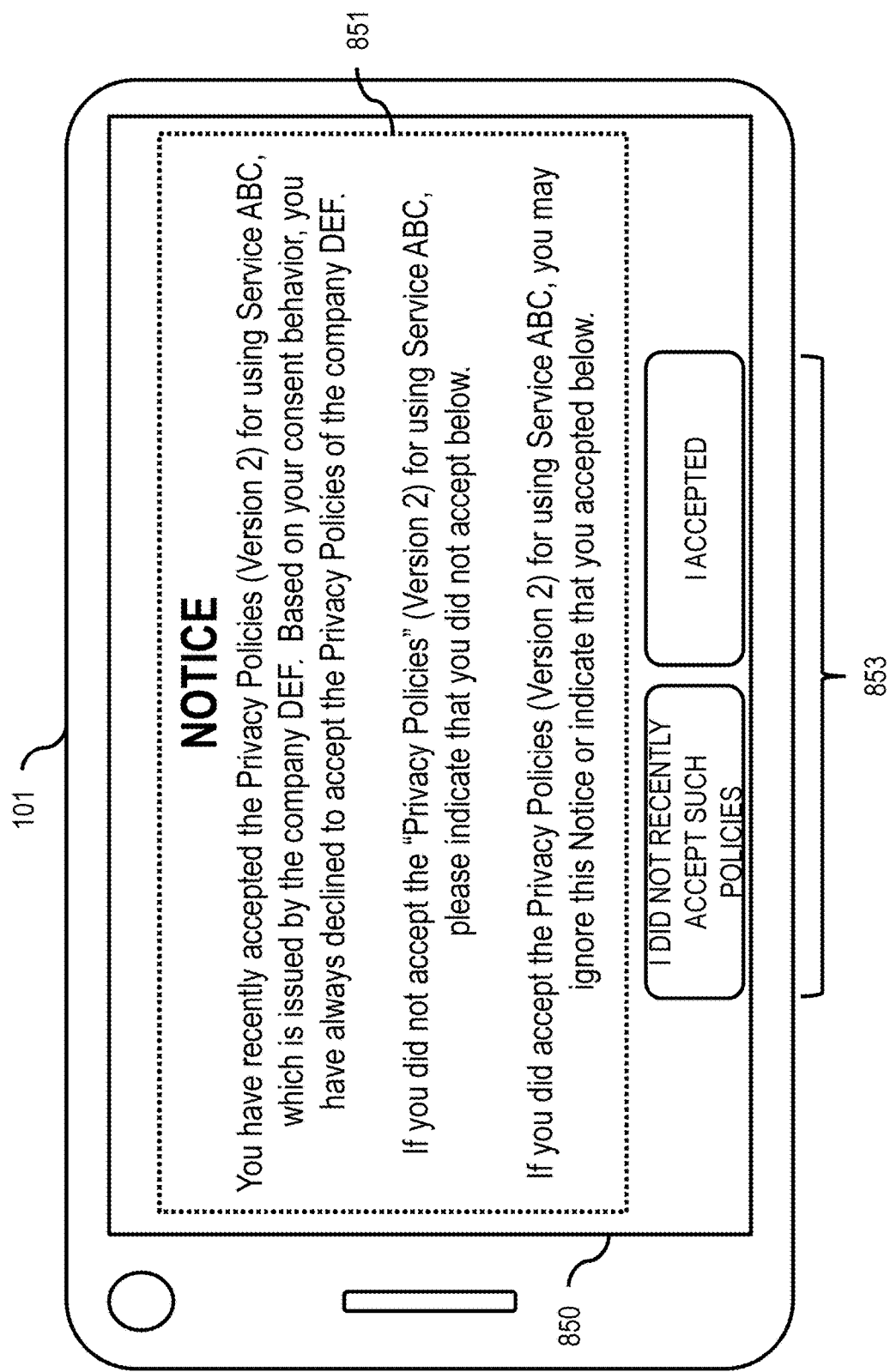

METHOD AND APPARATUS FOR CONSENT DOCUMENT MANAGEMENT

RELATED APPLICATIONS

This application is a continuation of U.S. patent application Ser. No. 13/720,410 filed Dec. 19, 2012, entitled "Method and Apparatus for Consent Document Management", which claims the benefit of the earlier filing date under 35 U.S.C. § 119(e) of U.S. Provisional Application Ser. No. 61/581,903 filed Dec. 30, 2011, entitled "Method and Apparatus for Consent Document Management," the entirety of which is incorporated herein by reference.

BACKGROUND

Service providers and device manufacturers (e.g., wireless, cellular, etc.) are continually challenged to deliver value and convenience to consumers by, for example, providing compelling network services. Prior to receiving the benefits of such services, end-users generally must agree to terms and conditions, privacy policies, etc., associated with these services. Documents, containing these terms and conditions, privacy policies, etc., are typically downloaded from the Internet, hard-coded into applications providing such services, attained from files on the local device hosting such applications, etc. However, these documents are not necessarily the latest versions or locally correct. Moreover, the storage of such documents and responses to such documents are not performed in a centralized manner. As such, users may be prevented from accessing consent-related records, be required to resubmit previous responses, etc., for instance, when they switch or replace applications, services, or devices.

SOME EXAMPLE EMBODIMENTS

Therefore, there is a need for an approach for consent document management.

According to one embodiment, a method comprises causing, at least in part, a creation of one or more consent document objects representing one or more consent documents, metadata associated with the consent documents, or a combination thereof. The method also comprises processing and/or facilitating a processing of one or more responses to the one or more consent documents to cause, at least in part, a creation of one or more user response objects, wherein the one or more user response objects record the one or more responses on a per user basis.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a creation of one or more consent document objects representing one or more consent documents, metadata associated with the consent documents, or a combination thereof. The apparatus is also caused to process and/or facilitate a processing of one or more responses to the one or more consent documents to cause, at least in part, a creation of one or more user response objects, wherein the one or more user response objects record the one or more responses on a per user basis.

According to another embodiment, a computer-readable storage medium carries one or more sequences of one or more instructions which, when executed by one or more processors, cause, at least in part, an apparatus to cause, at least in part, a creation of one or more consent document objects representing one or more consent documents, metadata associated with the consent documents, or a combination thereof. The apparatus is also caused to process and/or facilitate a processing of one or more responses to the one or more consent documents to cause, at least in part, a creation of one or more user response objects, wherein the one or more user response objects record the one or more responses on a per user basis.

According to another embodiment, an apparatus comprises means for causing, at least in part, a creation of one or more consent document objects representing one or more consent documents, metadata associated with the consent documents, or a combination thereof. The apparatus also comprises means for processing and/or facilitating a processing of one or more responses to the one or more consent documents to cause, at least in part, a creation of one or more user response objects, wherein the one or more user response objects record the one or more responses on a per user basis.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is a diagram of consent document objects, according to one embodiment;

FIGS. 8A-8C are diagrams of user interfaces utilized in the processes of FIGS. 3-5, according to various embodiments;

DESCRIPTION OF SOME EMBODIMENTS

Examples of a method, apparatus, and computer program for consent document management are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
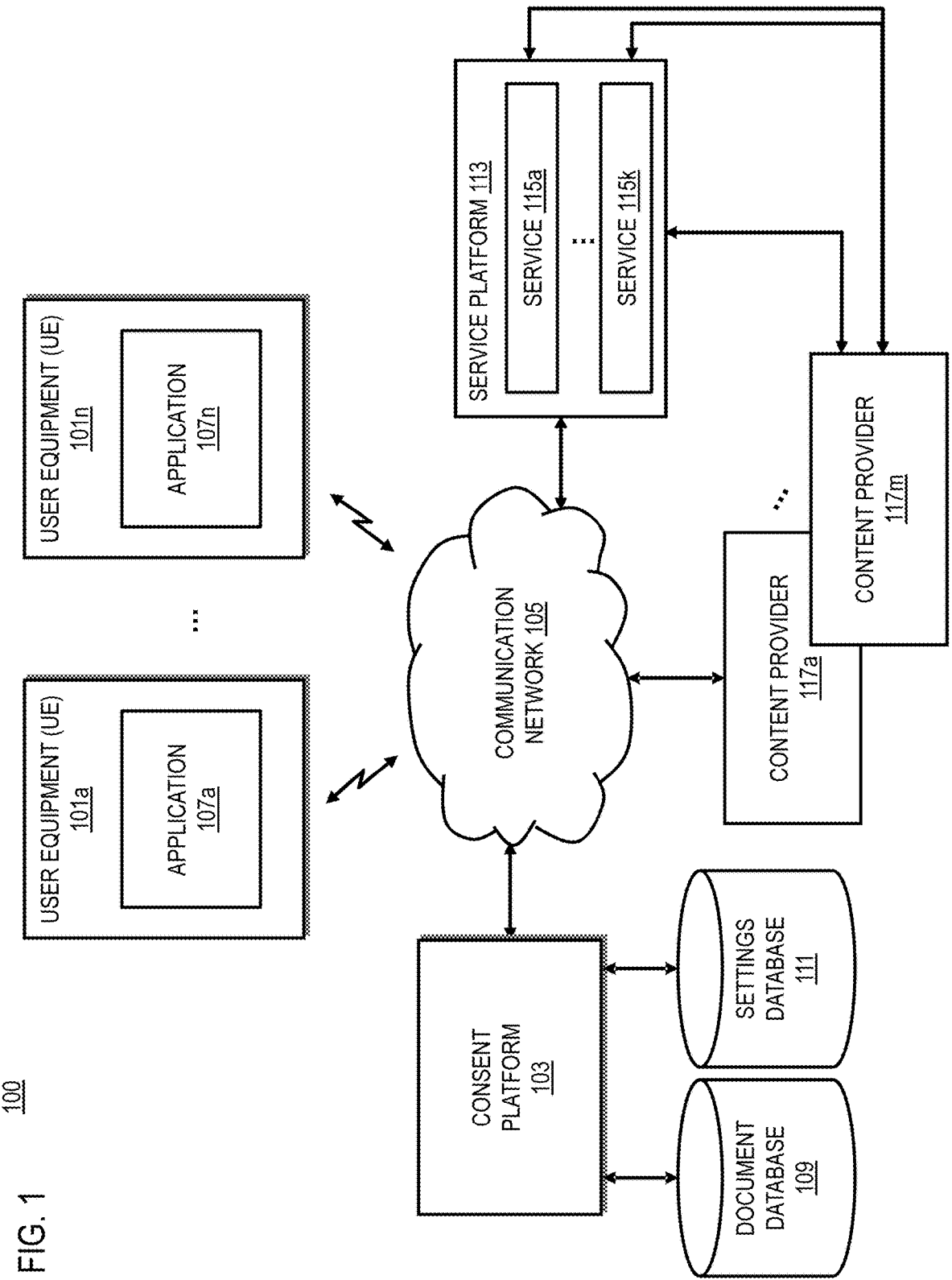
FIG. 1 is a diagram of a system capable of consent document management, according to one embodiment.

FIG. 1 is a diagram of a system capable of consent document management, according to one embodiment. As discussed, typical approaches to providing consent documents (e.g., documents that contain terms and conditions, privacy or security policies, marketing consents, etc.) typically do not offer a mechanism to ensure that users are supplied with the latest versions of the consent documents (e.g., notwithstanding the particular version of the application, device, etc.), that the consent documents are appropriate for the specific jurisdiction, etc. For example, a local installation file for a particular application may contain a consent document that was appropriate when the application was installed for the first time. Due to circumstantial changes, a new version of the consent document may later be adopted for the current and future versions of the application. Nonetheless, when the local installation file is reused to reinstall the application, the user will generally be presented with the older version of the consent document contained within the local installation file. In addition, the storage of such documents and responses to such documents are generally not performed in a centralized manner. In some instances, the particular responses (e.g., accept, decline, etc.) are not recorded at all, but merely act to enable or prevent installation of an application (e.g., if "Accept," allow installation; otherwise, close installer program). As such, users may be prevented from accessing consent-related records, be required to resubmit previous responses, etc., for instance, when they switch or replace applications, services, or devices.

To address this problem, a system 100 of FIG. 1 introduces the capability to manage consent documents as well as responses to consent documents, for instance, through the use of consent document objects and user response objects. Specifically, the system 100 may create consent document objects representing consent documents and/or metadata associated with the consent documents. The system 100 may further process responses to the consent documents to create user response objects that record the responses on a per user basis (e.g., each user response object records the responses of an individual user rather than the responses of user groups, collective responses, etc.). Consent document objects and user response objects may, for instance, be centrally stored for access by various applications, devices, users, etc. The following details and embodiments illustrate situations in which the consent document objects and user response objects can be effectively utilized to enable distribution and maintenance of consent documents, solicitation and recording of responses to these consent documents, and enforcement of associated agreed-upon terms/policies.

As shown in FIG. 1, the system 100 comprises a user equipment (UE) 101 (or multiple UEs 101a-101n) having connectivity to a consent platform 103 via a communication network 105. The UE 101 may include or have access to an application 107 (e.g., applications 107a-107n) to enable the UE 101 to interact with, for instance, the consent platform 103, which may: (1) cause a creation of consent document objects representing consent documents and/or metadata associated with the consent documents; (2) process responses to the consent documents to create user response objects that record the responses on a per user basis; (3) present the consent document objects and/or the user response objects on an application and/or a device based on one or more user interface capabilities determined for the application and/or the device; (4) query the consent document objects and/or the user response objects for the consent documents and/or the responses based on predetermined criteria; (5) process the consent document objects and/or the user response objects to determine consent behavior of one or more users associated with the consent document objects and/or the user response objects; or (6) perform other functions. The consent platform 103 may include or have access to a document database 109 to access or store consent document objects, consent documents, metadata associated with the consent documents, etc. The consent platform 103 may also include or have access to a settings database 111 to access or store user response objects, specific settings for various application/device, settings related to sharing and access control, etc. Data stored in the document database 109 and the settings database 111 may, for instance, be provided by the UEs 101, a service platform 113, one or more services 115 (or services 115a-115k), one or more content providers 117 (or content providers 117a-117m), and/or other services available over the communication network 105. It is noted that the consent platform 103 may be a separate entity of the system 100, a part of the one or more services 115 of the service platform 113, or included within the UE 101 (e.g., as part of the application 107).

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the consent platform 103 may determine one or user interface capabilities of one or more applications, one or more devices, or a combination thereof. The consent platform 103 may then cause, at least in part, a presentation of the one or more consent document objects, the one or more user response objects, or a combination thereof based, at least in part, on the one or more user interface capabilities. By way of example, an installer application running on a particular mobile device may request presentation of a consent document object on the mobile device. In response, the consent platform 103 may identify user interface capability values associated with the user interface capabilities of the installer application and the mobile device (e.g., the presentation request may include identifiers for the installer application and the mobile device that can be used to look up the user interface capability values, the presentation request may include the user interface capability values, etc.). Moreover, the consent platform 103 may identify the user interface capability values associated with the consent document object, and then match the user interface capability values of the installer application and the mobile device with the user interface capability values of the consent document object. As a result, the consent document object may be presented on the user interface of the installer application based on the matching of the respective user interface capability values (e.g., by converting the consent document object into application-specific or device-specific content based on the matching, and transmitting the application-specific or device-specific content to the requesting application/device). It is noted that various features of the consent platform 103 may also exist at the mobile device. For example, after the mobile device is provided with the consent document object (e.g., representing a consent document and metadata associated with the consent document), the mobile device may perform the identification, matching, and presentation steps, as described above.

In another embodiment, the consent platform 103 may determine to query the one or more consent document objects, the one or more user response objects, or a combination thereof for the one or more consent documents, the one or more responses, or a combination thereof based, at least in part, on one or more predetermined criteria. The one or more predetermined criteria may, for instance, include a document identifier, a jurisdiction identifier, a language identifier, a version identifier, a user identifier, or a combination thereof. In one scenario, an application may, for instance, request the latest version of its corresponding privacy policy for Finland in Swedish. Consequently, the consent platform 103 may search through the one or more consent documents (e.g., by querying the document database 109) for the desired privacy policy, for instance, based on an associated document identifier (e.g., corresponding to the application) and the terms "latest," "Finland," and "Swedish."

In another scenario, an application may be programmed to determine whether a user has already consented to the application's latest terms and conditions prior to the user initiating use of the application. Thus, the application may query the one or more user response objects (e.g., by querying the settings database 111) based on a user identifier associated with the user and the associated document identifier. In this way, the user does not need to resubmit consent every time that the application is reinstalled on the same device, installed on another device, etc. In a further scenario, the application may also check (e.g., periodically, upon detection of a new version, etc.) to see if the user has consented to the latest version of the associated consent document. If, for instance, the application detects that a new version of the associated consent document is available, the application may query the one or more user response objects to determine whether the user has already accepted the latest version's terms and conditions. Accordingly, the consent platform 103 may be utilized to ensure that users have accepted the latest versions of terms and conditions, privacy and security policies, marketing consents, etc., prior to using respective applications, services, etc. Similarly, such an approach may be utilized to ensure that users have agreed to the appropriate consent documents according to the jurisdiction, the language, etc.

In another embodiment, the consent platform 103 may determine context information associated with the one or more responses upon a detection of the one or more responses, wherein the one or more user response objects include, at least in part, the context information. In one use case, for instance, a user response object may contain a timestamp representing the date and time that a response (e.g., some level of acceptance, decline, etc.) was submitted by a user. It is noted that the timestamps included with the user response objects may be useful in a number of circumstances, including a determination of which particular terms, policies, etc., should apply in various situations. By way of example, content sharing policies may differ from one version of a consent document to another version of the consent document. If, for instance, the laws of a certain jurisdiction prohibits the retroactive application of new/modified terms to previous user activities/actions (e.g., previously uploaded pictures), then user activities/actions that occurred prior to the recorded time-stamped acceptance of the new/modified terms will be governed by the old/unmodified terms (e.g., a picture taken before the acceptance of the new policy will be based on the old policy). In another scenario, the user response object may include location information with respect to the location of the user when the user submitted the response.

In another embodiment, the consent platform 103 may determine one or more timelines associated with the one or more user response objects based, at least in part, on the context information. As discussed, the one or more use response objects may include the context information, such as timestamps representing the dates and times that associated responses were submitted by respective users. Thus, in one scenario, the one or more timelines for the one or more user response objects may be according to the timestamps. In a further scenario, a user may log into his/her account to check the user's consent history with respect to all of the applications and services that the user has previously utilized. To facilitate user readability, the user response objects (e.g., representing the responses that the user has given) may be rendered for the user based on the timeline determined for the user response objects of the user.

In another embodiment, the consent platform 103 may process and/or facilitate a processing of the one or more consent document objects, the one or more user response objects, or a combination thereof to determine consent behavior of one or more users associated with the one or more consent document objects, the one or more user response objects, or a combination thereof. By way of example, the consent platform 103 may determine consent behavior of a particular user by querying the one or more consent document objects and the one or more user response objects (e.g., by querying the document database 109 and the settings database 111) and analyzing the various responses to associated consent documents.

In another embodiment, the consent platform 103 may determine an inconsistency between at least one of the one or more user response objects and the consent behavior. The consent platform 103 may then cause, at least in part, a notification relating to at least one of the one or more responses associated with the at least one user response object based, at least in part, the inconsistency. In one use case, a user may be provided with an alert (e.g., via email, messenger, etc.) when it is determined that someone (or something) under the user's account has agreed to terms and conditions that are similar to terms and conditions that the user has consistently rejected in the past. If, for instance, the user did not accept the particular terms and conditions, the user may be provided with an option to decline the terms and conditions (e.g., by logging into his/her user account to cancel the acceptance). In this way, users may be protected from unauthorized consent to certain terms and conditions, for instance, that enable unauthorized access to user data (e.g., unauthorized consent caused by malware programs).

In another embodiment, the consent platform 103 may cause, at least in part, an association of the one or more consent document objects with one or more rules relating, at least in part, to a delivery, a presentation, an enforcement, or a combination thereof of the one or more consent document objects. By way of example, these rules may describe the supersession relationships between various consent document objects, such that a particular consent document object may supersede other consent document objects. Superseded consent document objects may, however, still be valid and enforceable, for instance, with respect to their associated policies that are not inconsistent with the associated policies of superseding consent document objects. In other words, the rules may dictate whether the terms and conditions, policies, etc., of certain consent document objects preempts the terms and conditions, policies, etc., of various other consent document objects.

In another embodiment, at least one of the one or more consent documents, at least one of the one or more responses, or a combination thereof are a supplement for at least another one of the one or more consent documents, at least another one of the one or more user response objects, or a combination thereof. In one scenario, a particular service provider may require that users agree to a primary consent document containing terms of service/use for applications distributed by the service provider before downloading and installing such applications. In addition, each of the applications may require that users agree to their own respective secondary consent documents before the respective applications may be downloaded or installed. The secondary consent documents may, however, be limited to supplementing the primary consent document based on the one or more rules associated with corresponding consent document objects. For example, the rules may enable the secondary consent documents to add to or modify certain portions of the primary consent document, while prohibiting the addition or modification of terms that are inconsistent with various other portions of the primary consent document. In this way, the consent platform 103 may enable dynamic tailoring of the required consent documents by application (or application developers) while ensuring that certain terms and conditions of the service provider are not overridden.

In a further embodiment, the consent platform 103 may cause, at least in part, a linking of the one or more consent document objects, the one or more user response objects, or a combination thereof to represent a composite of the respective consent documents, the respective responses, or a combination thereof. By way of example, a consent document object associated with the primary consent document may be linked with a consent document object associated with a secondary consent document to represent the complete consent document (e.g., the combination of the primary consent document and the secondary consent document) that a user is required to consent to in order to download and install a particular application from the service provider. Thus, the consent platform 103 may enforce the terms of the combined consent documents (e.g., based on the supersession or preemption rules) associated with the consent document objects based on the linking.

By way of example, the UE 101, the consent platform 103, the service platform 113, the services 115, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
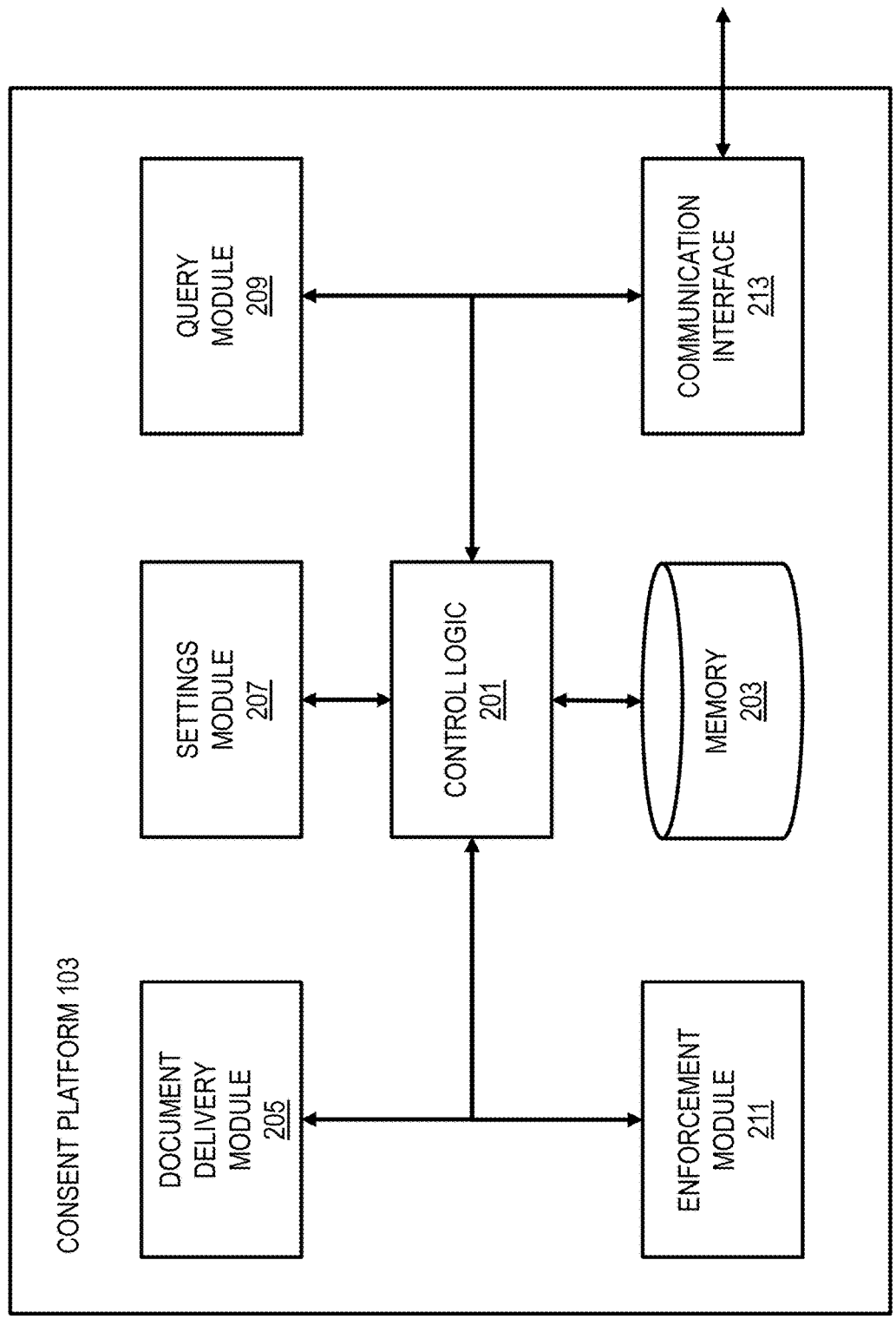
FIG. 2 is a diagram of the components of a consent platform, according to one embodiment.

FIG. 2 is a diagram of the components of a consent platform, according to one embodiment. By way of example, the consent platform 103 includes one or more components for consent document management. It is contemplated that the functions of these components may be combined in one or more components or performed by other components of equivalent functionality. In this embodiment, the consent platform 103 includes control logic 201, memory 203, a document delivery module 205, a settings module 207, a query module 209, an enforcement module 211, and a communication interface 213.

The control logic 201 executes at least one algorithm for executing functions of the consent platform 103. For example, the control logic 201 may interact with the document delivery module 205 to create consent document objects representing consent documents and/or metadata associated with the consent documents. The control logic 201 may also work with the settings module 207 to process responses to the consent documents to create user response objects that record the responses on a per user basis. Additionally, the document delivery module 205 and the settings module 207 may work together to determine user interface capabilities of a application, a device, etc., for presentation of the consent document objects and the user response objects on the application, the device, etc. As such, in some embodiments, the document delivery module 205 may be responsible for the management and presentation of necessary legal documents (e.g., the consent documents), such as terms and conditions, privacy and security policies, marketing consents, etc. The document delivery module 205 may, for instance, utilize the data infrastructure (e.g., of the document database 109) to store the consent document objects, the consent documents, metadata associated with the consent documents, etc., as necessary. In certain embodiments, the settings module 207 may be responsible for the management and presentation of individual user's settings related to consent acceptance (e.g., user response objects), specific sharing settings and access control, specific application and device settings, etc. The settings module 207 may make such settings globally available for the individual users, for instance, by storing the settings in the settings database 111.

Moreover, the control logic 201 may direct the query module 209 to query consent document objects and/or user response objects in the document database 109, the settings database 111, etc., for consent documents and/or responses based on predetermined criteria. As mentioned, the predetermined criteria may include a document identifier, a jurisdiction identifier, a language identifier, a version identifier, a user identifier, etc. Query requests may, for instance, be initiated by the document delivery module 205, the settings module 207, etc., to perform queries such as the "latest version of the privacy policy for Finland in Swedish." In various embodiments, query requests may further be utilized as a mechanism to update the consent document objects and the user response objects as well as the consent documents, the metadata associated with the consent documents, and individual user settings.

Furthermore, the control logic 201 may interact with the enforcement module 211 to apply the various settings to various data flows. For example, the enforcement module 211 may implement a filtering function based on the various settings when collecting information with respect to the consent document objects and the user response objects. In some embodiments, the enforcement module 211 may also enforce the rules relating to a delivery, a presentation, and/or an enforcement of the consent document objects. The control logic 201 may additionally utilize the communication interface 213 to communicate with other components of the consent platform 103, the UEs 101, the service platform 113, the services 115, the content providers 117, and other components of the system 100. For example, the communication interface 213 may transmit query requests from the document delivery module 205 or the settings module 207 to the query module 209. The communication interface 213 may further include multiple means of communication. In one use case, the communication interface 213 may be able to communicate over short message service (SMS), multimedia messaging service (MMS), internet protocol, email, instant messaging, voice sessions (e.g., via a phone network), or other types of communication.

Figure 3:
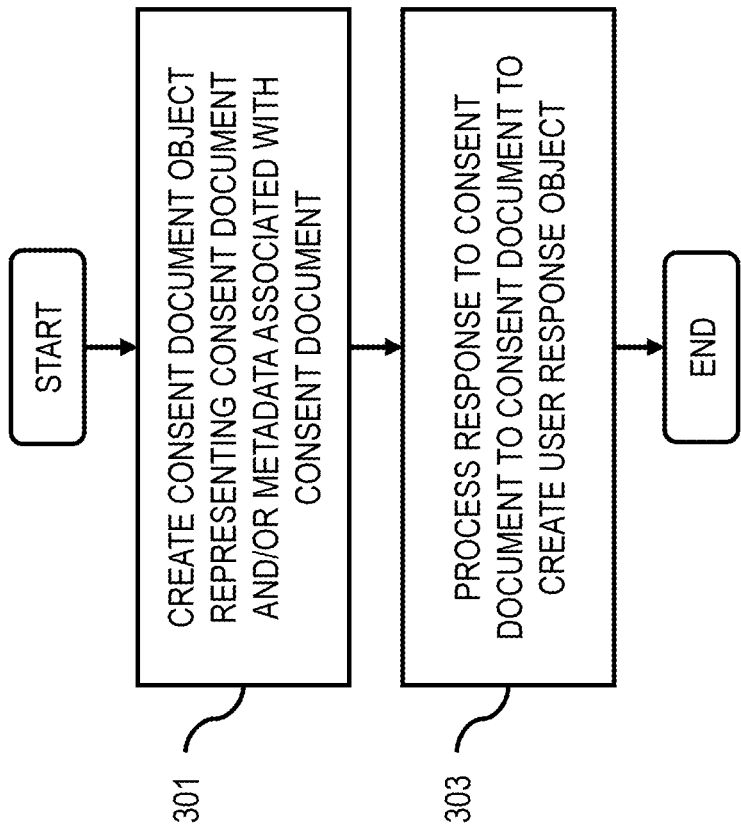
FIG. 3 is a flowchart of a process for consent document management, according to one embodiment.
Figure 10:
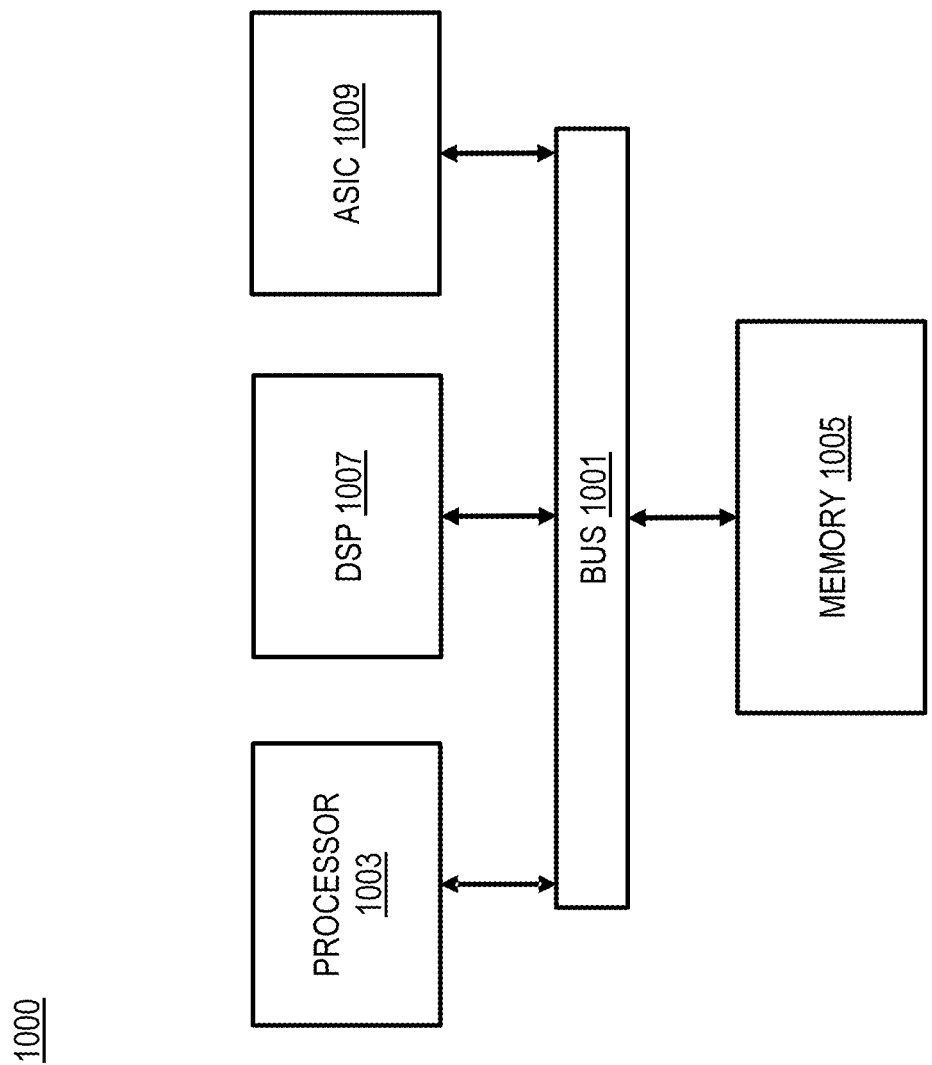
FIG. 10 is a diagram of a chip set that can be used to implement an embodiment of the invention.

FIG. 3 is a flowchart of a process for consent document management, according to one embodiment. In one embodiment, the consent platform 103 performs the process 300 and is implemented in, for instance, a chip set including a processor and a memory as shown in FIG. 10. As such, the control logic 201 can provide means for accomplishing various parts of the process 300 as well as means for accomplishing other processes in conjunction with other components of the consent platform 103.

In step 301, the control logic 201 may cause, at least in part, a creation of one or more consent document objects representing one or more consent documents, metadata associated with the one or more consent documents, or a combination thereof. In one scenario, these consent document objects may be stored in a central database (e.g., the document database 109) that is accessible by a number of applications and devices. As such, these applications and devices may check the central database for the most relevant adaptation of the consent document (e.g., the latest version of a consent document for a particular application or device, the appropriate consent document for the jurisdiction and the user's predetermined language, etc.).

In step 303, the control logic 201 may process and/or facilitate a processing of one or more responses to the one or more consent documents to cause, at least in part, a creation of one or more user response objects, wherein the one or more user response objects record the one or more responses on a per user basis. As an example, these user response objects may be stored in the settings database 111 for access by various applications and devices, for instance, to check for previously acceptance of particular consent documents by users when reinstalling applications on a device, reinitiating service on the device, installing the applications or services on another device, etc. In this way, users can avoid having to go through the consent process multiple times with respect to the same consent document.

Figure 4:
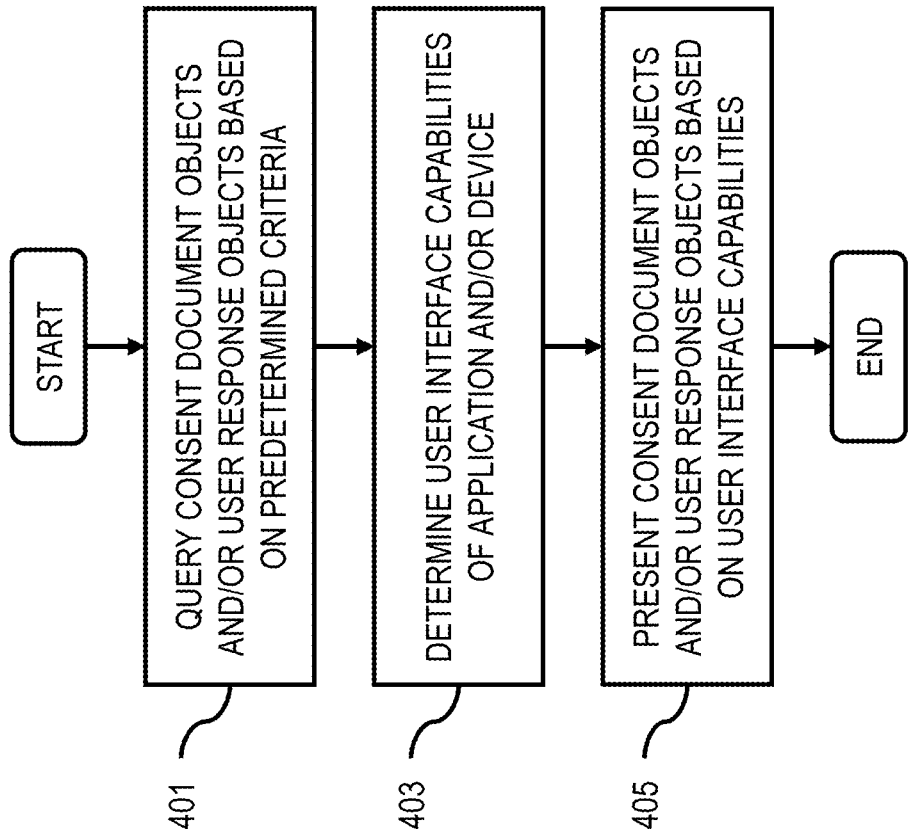
FIG. 4 is a flowchart of a process for presenting consent document objects and user response objects on various applications and devices, according to one embodiment.

FIG. 4 is a flowchart of a process for presenting consent document objects and user response objects on various applications and devices, according to one embodiment. In one embodiment, the consent platform 103 performs the process 400 and is implemented in, for instance, a chip set including a processor and a memory as shown in FIG. 10. As such, the control logic 201 can provide means for accomplishing various parts of the process 400 as well as means for accomplishing other processes in conjunction with other components of the consent platform 103.

In step 401, the control logic 201 may determine to query the one or more consent document objects, the one or more user response objects, or a combination thereof for the one or more consent documents, the one or more responses, or a combination thereof based, at least in part, on one or more predetermined criteria. As mentioned, the one or more predetermine criteria may include, at least in part, a document identifier, a jurisdiction identifier, a language identifier, a version identifier, a user identifier, or a combination thereof. These criteria may, for instance, be utilized to determine consent document objects or user response objects to render the content of consent documents or user responses to consent documents on an application, a service, a device, etc. (e.g., presenting the content of a consent document to a user for review prior to accepting the consent document, providing the user with a list of consent documents that the user has accepted, etc.).

As such, when the consent document objects and/or user response objects are determined, the control logic 201 may, at step 403, determine one or user interface capabilities of one or more applications, one or more devices, or a combination thereof. Subsequently, in step 405, the control logic 201 may cause, at least in part, a presentation of the one or more consent document objects, the one or more user response objects, or a combination thereof based, at least in part, on the one or more user interface capabilities. As discussed, the determined user interface capabilities may be utilized to process the content document objects or the user response objects to produce content specifically formatted for the particular application or device rendering the content (e.g., the processed/converted objects).

Figure 5:
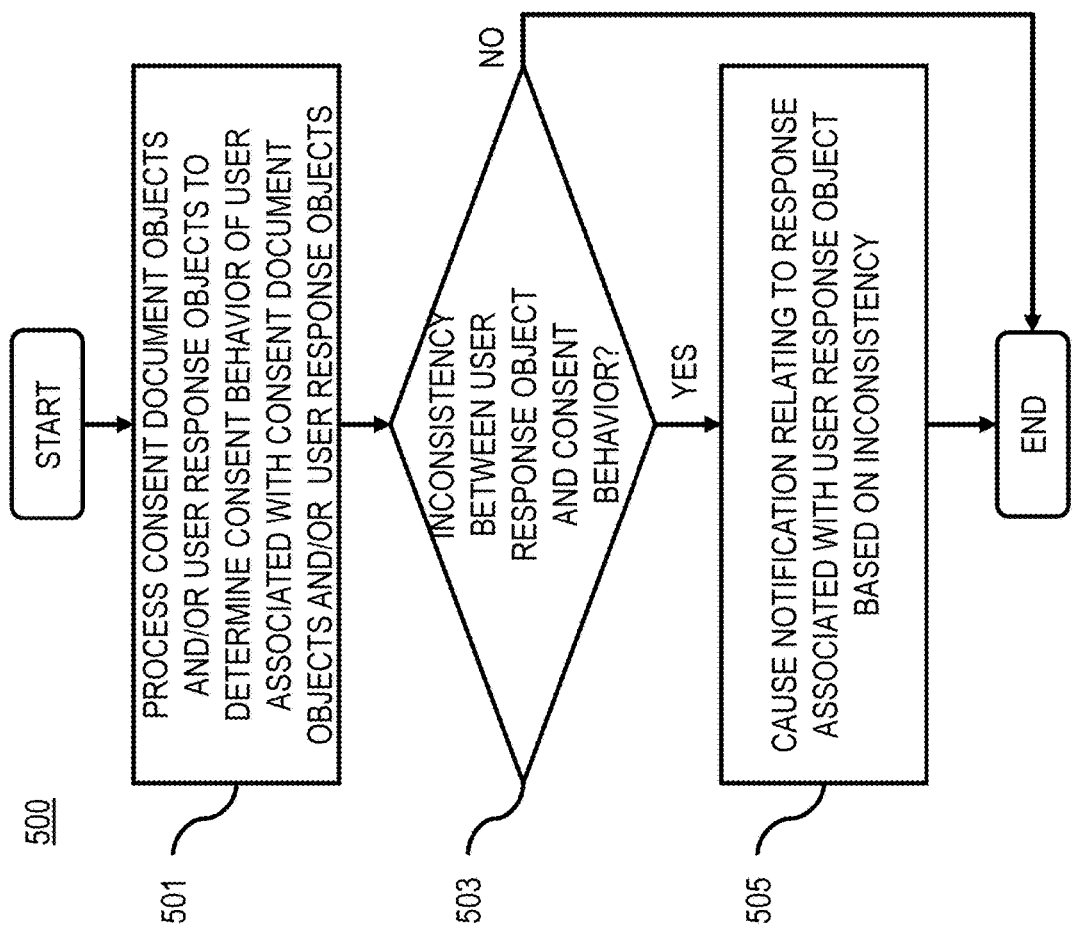
FIG. 5 is a flowchart of a process for providing notifications in response to inconsistent consent behavior, according to one embodiment.

FIG. 5 is a flowchart of a process for providing notifications in response to inconsistent consent behavior, according to one embodiment. In one embodiment, the consent platform 103 performs the process 500 and is implemented in, for instance, a chip set including a processor and a memory as shown in FIG. 10. As such, the control logic 201 can provide means for accomplishing various parts of the process 500 as well as means for accomplishing other processes in conjunction with other components of the consent platform 103.

In step 501, the control logic 201 may process and/or facilitate a processing of the one or more consent document objects, the one or more user response objects, or a combination thereof to determine consent behavior of one or more users associated with the one or more consent document objects, the one or more user response objects, or a combination thereof. As mentioned, the consent behavior of a particular user may be determined by querying the one or more consent document objects and the one or more user response objects (e.g., by querying the document database 109 and the settings database 111) and analyzing the various responses to associated consent documents.

In step 503, the control logic 201 may determine whether an inconsistency between at least one of the one or more user response objects and the consent behavior. If, for instance, an inconsistency between the at least one use response object and the consent behavior is determined, the control logic may, as in step 505, cause, at least in part, a notification relating to at least one of the one or more responses associated with the at least one user response object based, at least in part, the inconsistency. In one scenario, for instance, a malware program may cause a notion of acceptance to a particular consent document under the guise of a particular user. Nonetheless, if the notion of acceptance is determined to be inconsistent with the user's consent behavior, then an alert may be provided as an email, a SMS message, etc., to inform the user that such notion of acceptance has occurred. As additional protection, the user may then be provided with an option to cancel the acceptance caused by the malware program.

FIG. 6 is a diagram of consent document objects, according to one embodiment. As shown, the consent document objects 601 and 603 provide means to represent attributes, such as Version, Title, Country, Language, Content, Options, and Status. Version may, for instance, refer to a version numbering for the consent document associated with the consent document object. Title may refer to a short human-readable title for the consent document. Country may refer to the jurisdiction that the consent document is direct to, and Language may refer to the language that the consent document is written in. Values for the Country and Language attributes may, for instance, be represented by International Organization for Standardization (ISO) codes (e.g., "FI," "EN," etc.). Content may refer to a reference to the text of the consent document. Options may refer to a list of selection criteria that a user can make with respect to the consent document (e.g., "accept, decline", "all, city, country, none", etc.). Status may refer to the current internal status of the consent document object (e.g., "valid, depreciated").

Identification of consent document objects may, for instance, be performed based on a document identifier, a jurisdiction identifier, a language identifier, a version identifier, etc. In some embodiments, the document identifier may not be a unique identifier since a single consent document may be used across multiple versions (e.g., a primary consent document may be supplemented by later secondary consent documents representing later versions), countries, and languages. Thus, in such cases, the unique identification of each consent document object may be based on a plurality of the above multiple attributes.

Figure 7:
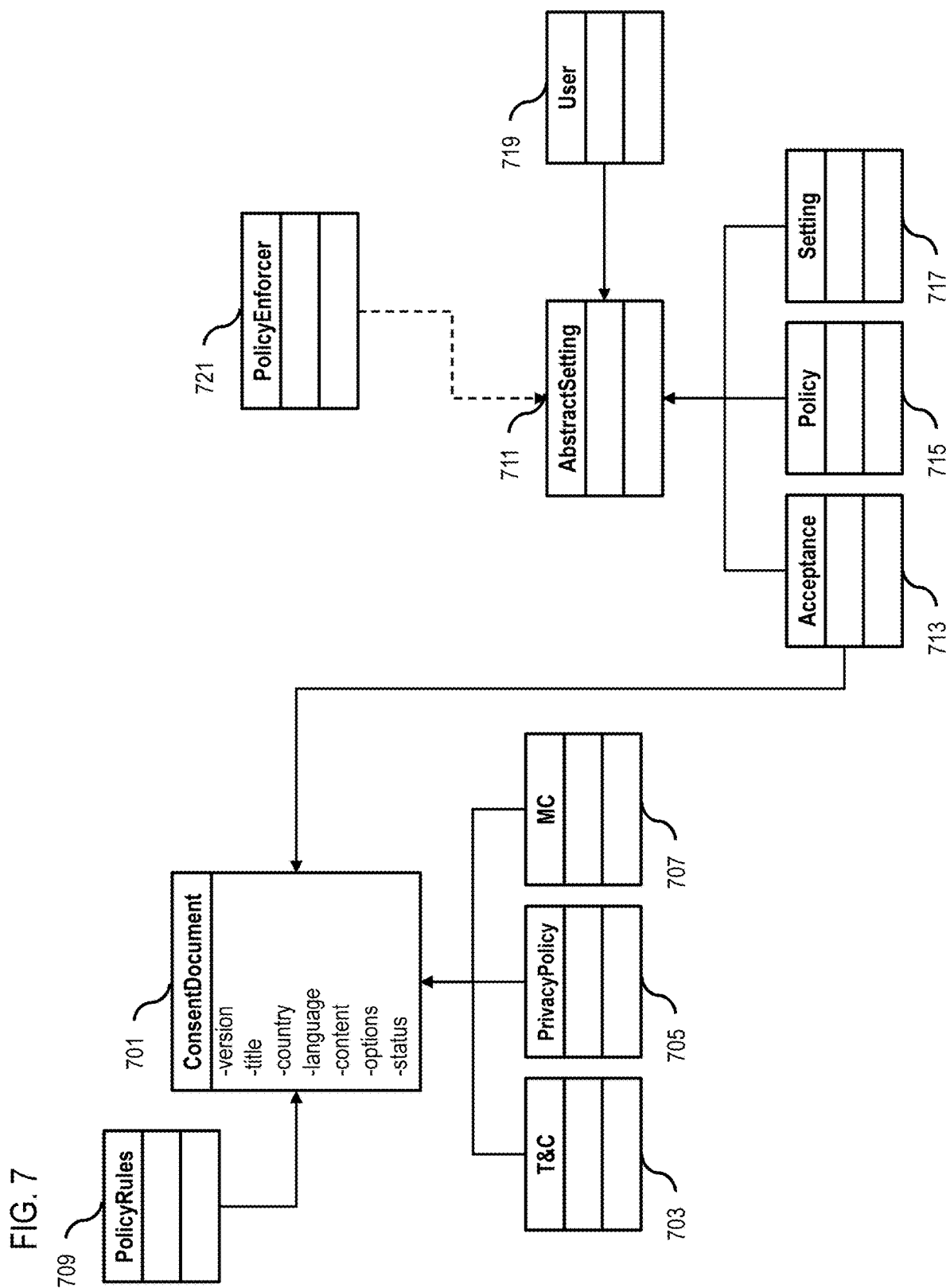
FIG. 7 provides high-level class diagrams for various base components, according to one embodiment.

FIG. 7 provides high-level class diagrams for various base components, according to one embodiment. As shown, and as previously indicated, a consent document object (e.g., represented by class diagram 701) may include a number of attributes, such as Version, Title, Country, Language, Content, Options, and Status. Moreover, a consent document object may further be defined as any number of consent document object types, such as terms and conditions, privacy policies, and marketing consent (e.g., represented by class diagrams 703, 705, and 707). As discussed, the consent document objects may also be associated with one or more rules (e.g., represented by class diagram 709) related to a delivery, a presentation, or an enforcement of the consent document objects.

The settings data model (e.g., represented by class diagram 711) may include several categories of settings and policies, such as acceptance (or user response objects), policies, and settings (e.g., represented by class diagrams 713, 715, and 717). With regard to the settings data model, settings and policies are made on a per user basis (e.g., by association of class diagrams 711 and 719). That is, for any given user, a number of individual settings and policies can be made, but each user's settings are separate and non-mixable with any other user's settings and policies. As such, the recording of responses (e.g., the notion of acceptance) is also made on a per user basis. As indicated, the possible answers for an acceptance may be derived from a given consent document's values for the options attribute. Additionally, or alternatively, a timestamp may be recorded with each of the settings. As an example, a user response object may record the date and time that a user accepts a particular consent document, for instance, based on when the response was detected. Furthermore, an enforcement function, object, or component (e.g., represented by class diagram 721) may apply the settings of individual users against the actions of the associated applications, devices, etc. For example, a filtering function may be implemented based on the various settings when collecting information with respect to the consent document objects and the user response objects.

Figure 8A:
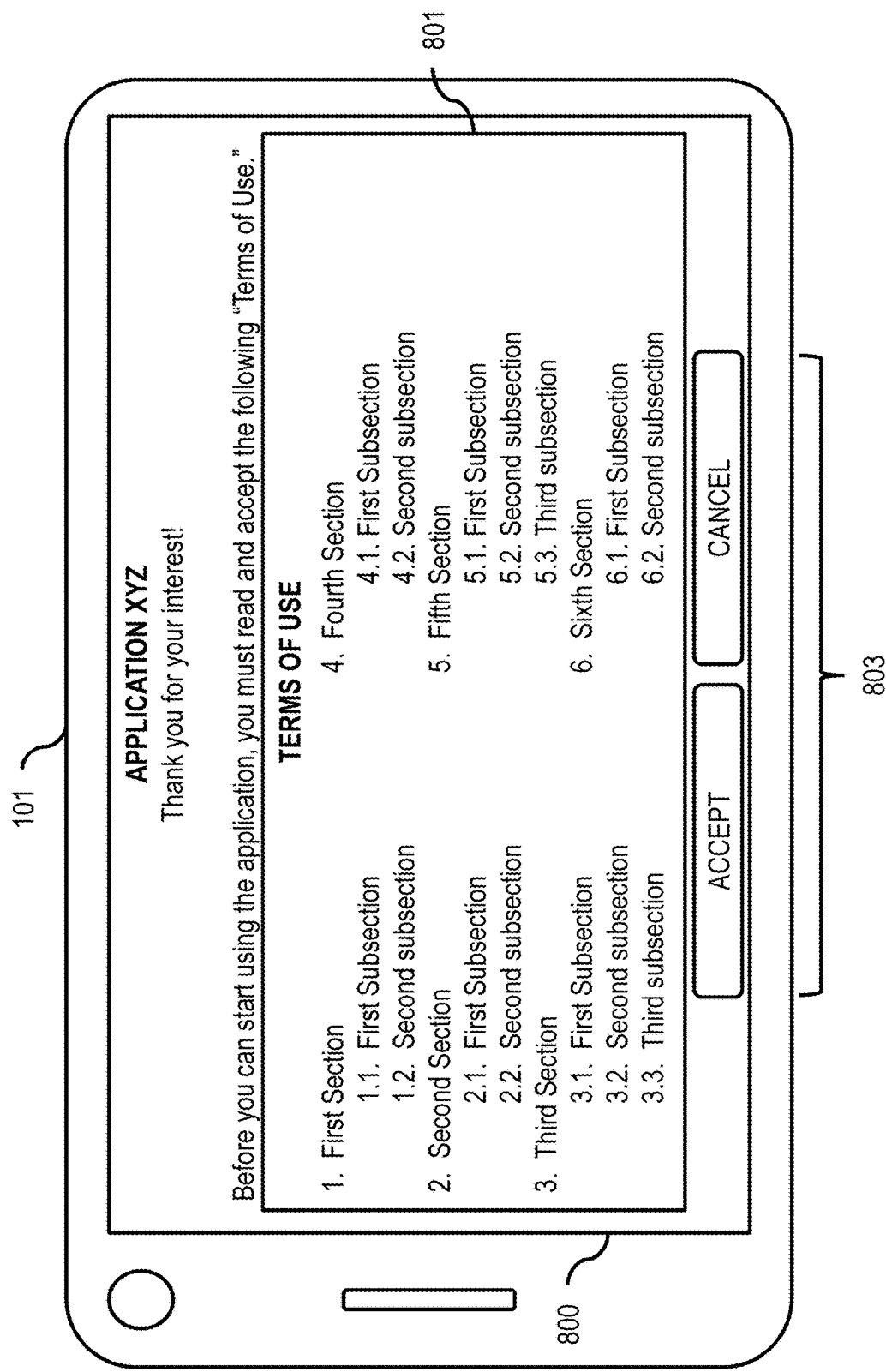

FIGS. 8A-8C are diagrams of user interfaces utilized in the processes of FIGS. 3-5, according to various embodiments. FIG. 8A features the UE 101, which provides the user interface 800 with a frame window 801 and options 803. As illustrated, the Application XYZ has requested a consent document from the document database 109, for instance, by submitting a request to query the consent document objects of the document database 109 based on an associated document identifier and the latest version identifier as well as the identifiers for the appropriate jurisdiction and language. In addition, the user interface capabilities of the Application XYZ and the UE 101 may be determined, and application/device-specific content representing the consent document object may be produced based on the determined user interface capabilities for presentation on the application and the device. By way of example, the content of the consent document associated with the consent document object may be formatted based on the percentage of the width and height of the window frame 801 with respect to the resolution of the display of the UE 101. As a result, the content may be presented on the user interface 800 without having to horizontal or vertically scroll the window frame 801 to view the entirety of the "Terms of Use" for Application XYZ.

FIG. 8B features the UE 101, which provides the user interface 830 with a window frame window 831. In this case, the consent history of User X is presented on the user interface 830 of the UE 101. As with the presentation of the consent document object, the user response objects may be presented based on a determination of the user interface capabilities of the UE 101 to enable full viewing of the consent history without having to horizontally or vertically scroll the window frame 831. As shown, the detailed list in window frame 831 is sorted by application names and the version of the respective consent documents as represented in the consent document objects.

FIG. 8C features the UE 101, which provides the user interface 850 with a notification 851 and options 853. As mentioned, consent behavior of individual users may be determined by processing the consent document objects and the user response objects associated with the individual users. If, for instance, an inconsistency between a user response object and the consent behavior is determined, the user associated with the consent behavior may be alerted of the inconsistent behavior. In FIG. 8C, the user is being informed that he/she has recently accepted Version 2 of Privacy Policies issued by the company DEF for using Service ABC, but that the notion of acceptance is inconsistent with the user's consent behavior (e.g., the user has always declined to accept the Privacy Policies of the company DEF). As such, the user is given the opportunity to indicate that he/she did not accept Version 2 of Privacy Policies for using Service ABC to enable the consent platform 103 to take appropriate remedial measures.

The processes described herein for consent document management may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
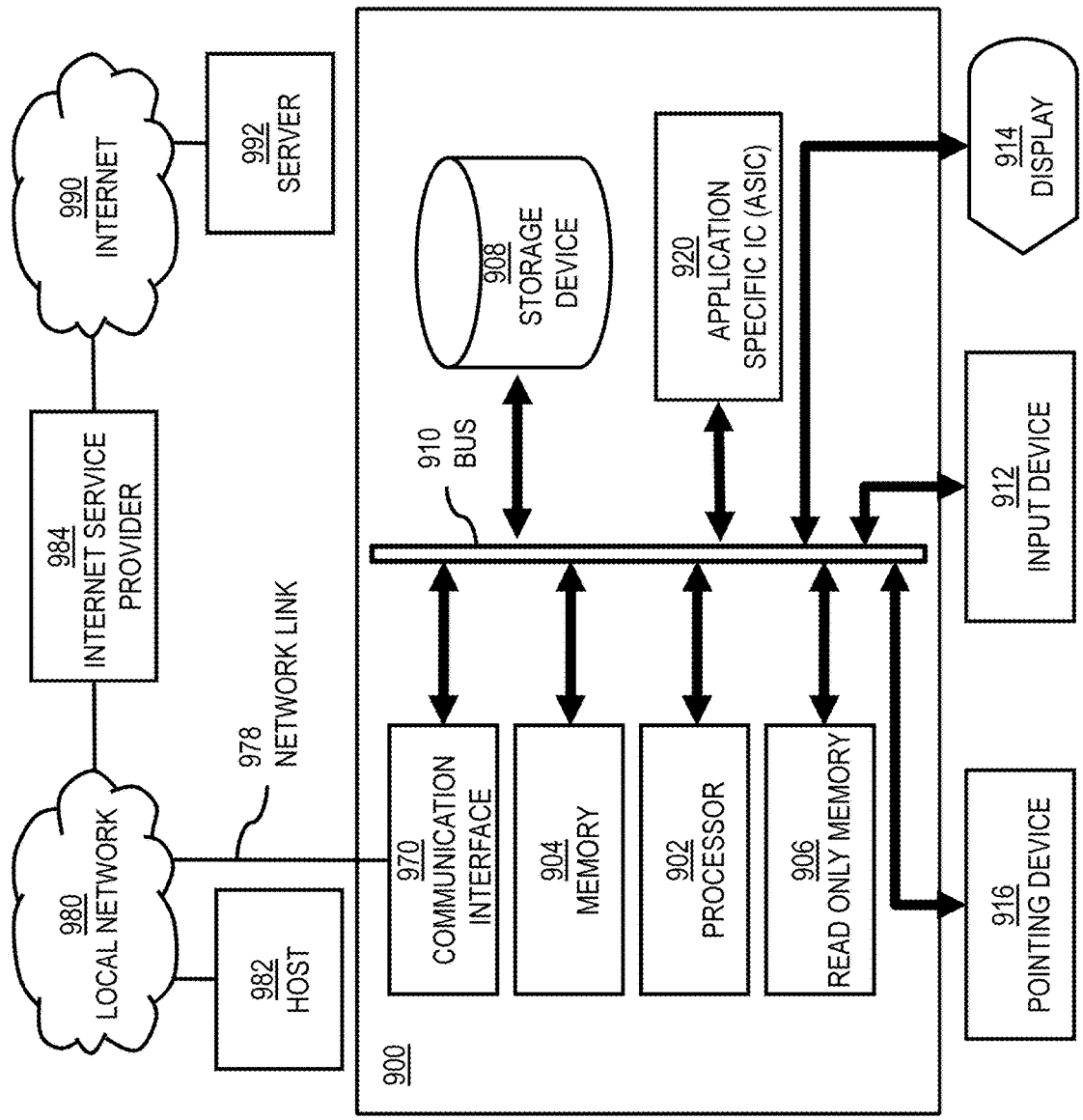
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to manage consent documents as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of consent document management.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to consent document management. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for consent document management. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for consent document management, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for providing consent document management to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to manage consent documents as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of consent document management.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to manage consent documents. The memory 1005 also stores the data associated with or generated by the execution of the inventive steps.

Figure 11:
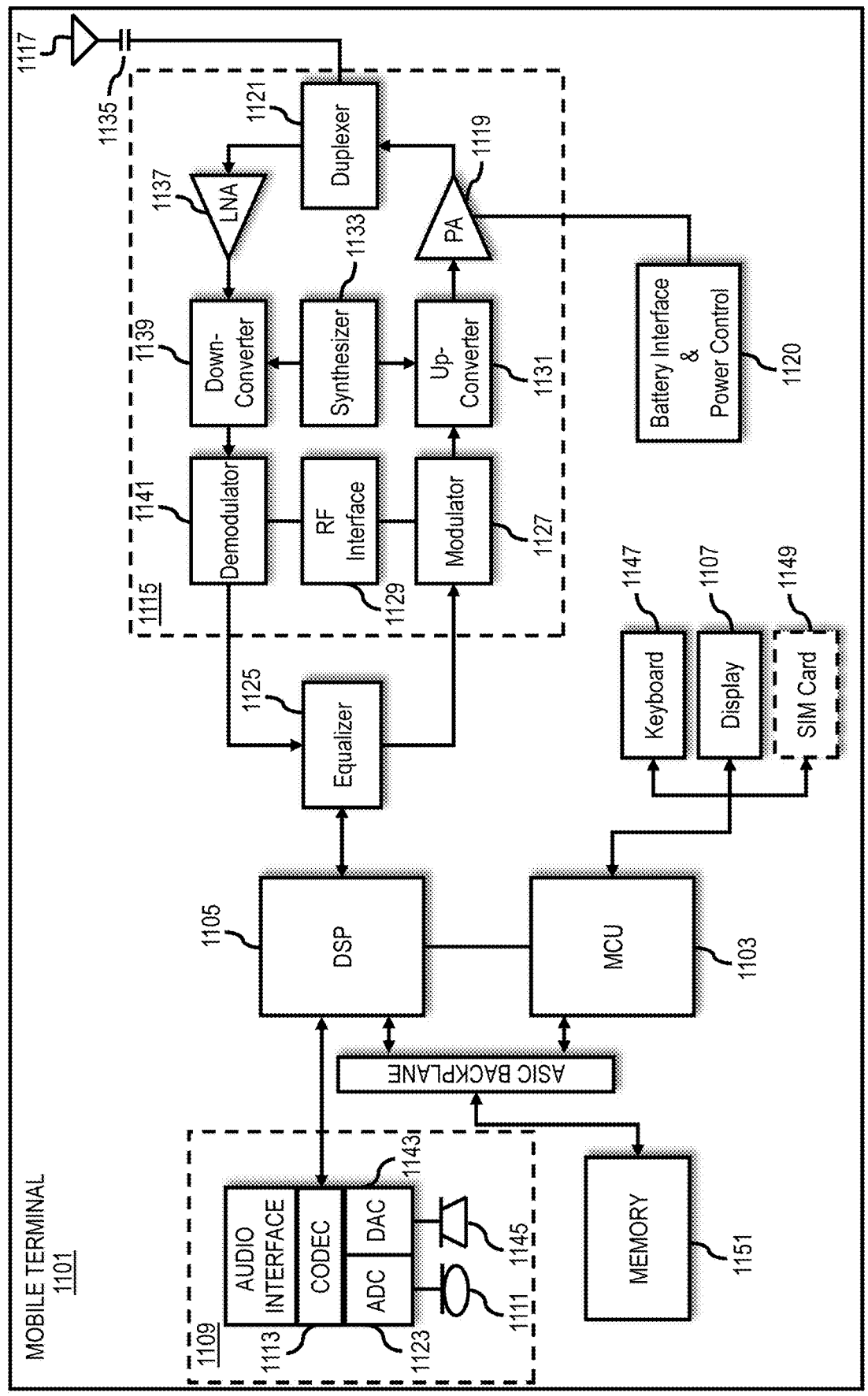
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of consent document management. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of consent document management. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to manage consent documents. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   creating, by one or more processors, a consent document object representing a consent document tailored for an application and including one or more attributes retrieved from a settings data model, wherein the settings data model includes a plurality of attributes associated with one or more terms, one or more conditions, one or more privacy policies, one or more security policies, one or more marketing consents, or a combination thereof to be accepted by a plurality of users prior to using the application on devices, and the plurality of attributes includes a version, options of degrees of acceptance of the consent document per user, or a combination thereof;
   causing, by the one or more processors, a presentation of the consent document on a plurality of user interfaces in response to device requests for installing or using the application associated with the plurality of users;
   causing, by the one or more processors, a storage of user response objects specifying responses by the plurality of users to the consent document, wherein each of the user response objects includes one or more user responses to the one or more attributes of the consent document object;
   receiving, by the one or more processors via a network, a query for one or more of the user response objects for a particular one of the plurality of users;
   determining, by the one or more processors in response to the query, that the one user response object for the particular one of the plurality of users indicates a degree of acceptance of the consent document; and
   causing, by the one or more processors, a transmission of a permission via a network to enable the use of the application on a device of the particular one of the plurality of users.

2. The method of claim 1, further comprising:
   updating the consent document for the application according to a version identifier to track a version of the consent document; and
   determining whether the one user response object indicates acceptance to a latest version of the consent document.

3. The method of claim 1, wherein the plurality of attributes further includes jurisdiction, the method further comprising:
   determining whether the one user response object indicates acceptance to the consent document based on a jurisdiction identifier.

4. The method of claim 1, further comprising:
   detecting reinstalling of the application by the particular one of the plurality of users; and
   determining whether the one user response object indicates acceptance to the consent document based on a user identifier.

5. The method of claim 1, wherein the particular one of the plurality of users is further associated with a new device, the method further comprising:
   determining user interface capability of the new device of the particular one of the plurality of users;
   presenting, via a user interface having the determined user interface capability, the consent document object associated with the document;
   receiving, via the user interface, a user input in response to the consent document object; and
   creating a new response object based on the user input,
   wherein the degrees of acceptance of the consent document include a level of acceptance in addition to accept or decline.

6. The method of claim 1, further comprising:
   receiving the permission by the device of the particular one of the plurality of users; and
   initiating transmission of data by the application in response to the permission,
   wherein the plurality of attributes further includes one or more terms, one or more conditions, one or more privacy policies, one or more security policies, one or more marketing consents, of a combination thereof associated with the use of the application.

7. The method of claim 1, wherein the device of the particular one of the plurality of users is configured to communicate over a data network, or to another device, and wherein the consent document object is one of a plurality of consent document objects using the settings data model and stored in a central server.

8. The method of claim 1, further comprising:
linking a primary consent document object of a service provider with a secondary consent document object of a developer of the application in the settings data model; and
in response to the device requests for installing or using the application, combining the primary consent document object with the secondary consent document object to provide the consent document for the presentation.

9. An apparatus comprising:
at least one processor; and
at least one memory including computer program code for one or more programs,
the at least one memory and the computer program code configured to, with the at least one processor, cause the apparatus to perform at least the following:
cause a presentation of a consent document on a user interface of a device in response to a device request for installing or using an application, wherein the consent document is tailored for the application and includes one or more attributes retrieved from a settings data model, the settings data model includes a plurality of attributes associated with one or more terms, one or more conditions, one or more privacy policies, one or more security policies, one or more marketing consents, or a combination thereof accepted by a plurality of users prior to using the application on devices, and the plurality of attributes includes a version, options of degrees of acceptance of the consent document per user, or a combination thereof;
upon receiving one or more user responses to the one or more attributes of the consent document object, create user response objects specifying responses by the plurality of users to the consent document, wherein each of the user response objects includes the one or more user responses to the one or more attributes of the consent document object;
receive a query for one or more of the user response objects for a particular one of the plurality of users;
determine, in response to the query, that the one user response object for the particular one of the plurality of users indicates a degree of acceptance of the consent document; and
cause a transmission of a permission via a network to enable the use of the application on a device of the particular one of the plurality of users.

10. The apparatus of claim 9, wherein the apparatus is further caused to:
update the consent document for the application according to a version identifier to track a version of the consent document; and
determine whether the one user response object indicates acceptance to a latest version of the consent document.

11. The apparatus of claim 9, wherein the plurality of attributes further includes jurisdiction, the apparatus being further caused to:
determine whether the one user response object indicates acceptance to the consent document based on a jurisdiction identifier.

12. The apparatus of claim 9, wherein the apparatus being further caused to:
detect reinstalling of the application by the particular one of the plurality of users; and determine whether the one user response object indicates acceptance to the consent document based on a user identifier.

13. The apparatus of claim 9, wherein the particular one of the plurality of users is further associated with a new device, the apparatus being further caused to:
determine user interface capability of the new device of the particular one of the plurality of users;
present, via a user interface having the determined user interface capability, the consent document object associated with the document;
receive, via the user interface, a user input in response to the consent document object; and
create a new response object based on the user input.

14. The apparatus of claim 9, wherein the apparatus is further caused to:
receive the permission by the device of the particular one of the plurality of users; and
initiate transmission of data by the application in response to the permission.

15. The apparatus of claim 9, wherein the device of the particular one of the plurality of users is configured to communicate over a data network, or to another device.

16. A system comprising:
one or more servers configured to:
create a consent document object representing a consent document tailored for an application and including one or more attributes retrieved from a settings data model, wherein the settings data model includes a plurality of attributes associated with one or more terms, one or more conditions, one or more privacy policies, one or more security policies, one or more marketing consents, or a combination thereof to be accepted by a plurality of users prior to using the application on devices, and the plurality of attributes includes a version, options of degrees of acceptance of the consent document per user, or a combination thereof,
cause a presentation of the consent document on a plurality of user interfaces in response to device requests for installing or using the application associated with the plurality of users, and
cause a storage of user response objects specifying responses by the plurality of users to the consent document, wherein each of the user response objects includes one or more user responses to the one or more attributes of the consent document object,
wherein the one or more servers are further configured to:
receive, via a network, a query for one or more of the user response objects for a particular one of the plurality of users,
determine, in response to the query, that the one user response object for the particular one of the plurality of users indicates a degree of acceptance of the consent document, and
cause a transmission of a permission via a network to enable the use of the application on a device of the particular one of the plurality of users.

17. The system of claim 16, wherein the one or more servers are further configured to:
update the consent document for the application according to a version identifier to track a version of the consent document; and
determine whether the one user response object indicates acceptance to a latest version of the consent document.

18. The system of claim 16, wherein the plurality of attributes further includes jurisdiction, the one or more servers being further caused to:

determine whether the one user response object indicates acceptance to the consent document based on a jurisdiction identifier.

19. The system of claim 16, wherein the one or more servers being further caused to:
   detect reinstalling of the application by the particular one of the plurality of users; and
   determine whether the one user response object indicates acceptance to the consent document based on a user identifier.

20. The system of claim 16, wherein the particular one of the plurality of users is further associated with a new device, the one or more servers being further caused to:
   determine user interface capability of the new device of the particular one of the plurality of users;
   present, via a user interface having the determined user interface capability, the consent document object associated with the document;
   receive, via the user interface, a user input in response to the consent document object; and
   create a new response object based on the user input.

* * * * *